C. W. STEVENS.
MACHINE FOR TURNING IRREGULAR FORMS.
APPLICATION FILED JAN. 12, 1909.

964,327.

Patented July 12, 1910.

3 SHEETS—SHEET 2.

Witnesses:
Chas. W. Peard
Fred M. Dannenfelser

Inventor
C. W. Stevens
By his Attorneys
Barton Bowman Mitchell

THE NORRIS PETERS CO., WASHINGTON, D. C.

C. W. STEVENS.
MACHINE FOR TURNING IRREGULAR FORMS.
APPLICATION FILED JAN. 12, 1909.
964,327.
Patented July 12, 1910.
3 SHEETS—SHEET 3.
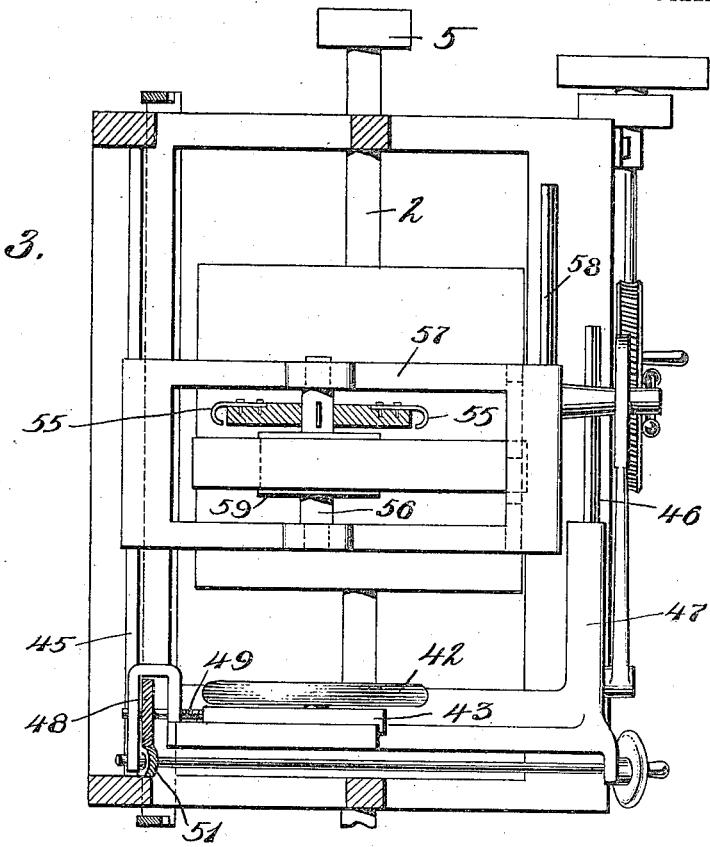
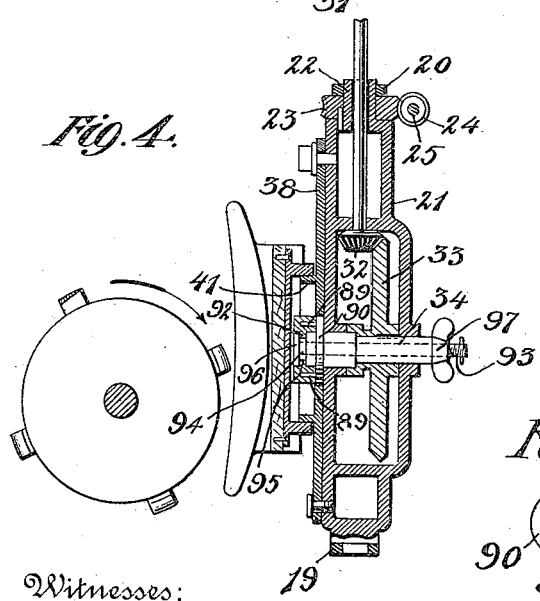
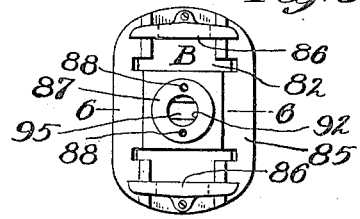
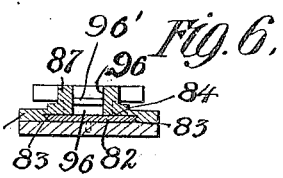
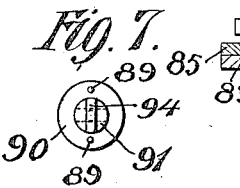
Witnesses:
Chas. A. Peard
Fred M. Dannenfelser
Inventor
C. W. Stevens
By his Attorneys

UNITED STATES PATENT OFFICE.

CHARLES W. STEVENS, OF NEW YORK, N. Y.

MACHINE FOR TURNING IRREGULAR FORMS.

964,327.  Specification of Letters Patent.  Patented July 12, 1910.

Application filed January 12, 1909. Serial No. 471,863.

*To all whom it may concern:*

Be it known that I, CHARLES W. STEVENS, a citizen of the United States, residing at New York city, county and State of New York, have invented certain new and useful Improvements in Machines for Turning Irregular Forms, of which the following is a full, clear, and exact description.

My invention relates to means for turning out forms or shapes in wood and like material, and is particularly concerned with mechanism for turning forms of irregular outline.

The object of the invention is to provide an apparatus in which the tracer and cutter may be so relatively adjusted as to vary the size of the form or work or shape produced with respect to the original pattern, both with respect to the perimeter of the form and with respect to its face contours.

A further object is to provide supporting mechanism both for the pattern and the work, which may be readily adjusted to present the perimeters of said parts to the tracer and cutter respectively, and which may be readily turned to present also the faces of said parts to the tracer and cutter respectively.

A further object is to provide means for so controlling the actuation of the pattern and work that, in the case of elliptical or irregular shapes both the pattern and work will be maintained in contact with the tracer and cutter respectively.

A further object is to provide for adjustably securing the tracer and the cutter carriage together, so that the same may travel in unison in various relative adjustments during the cutting operation.

Figure 1:
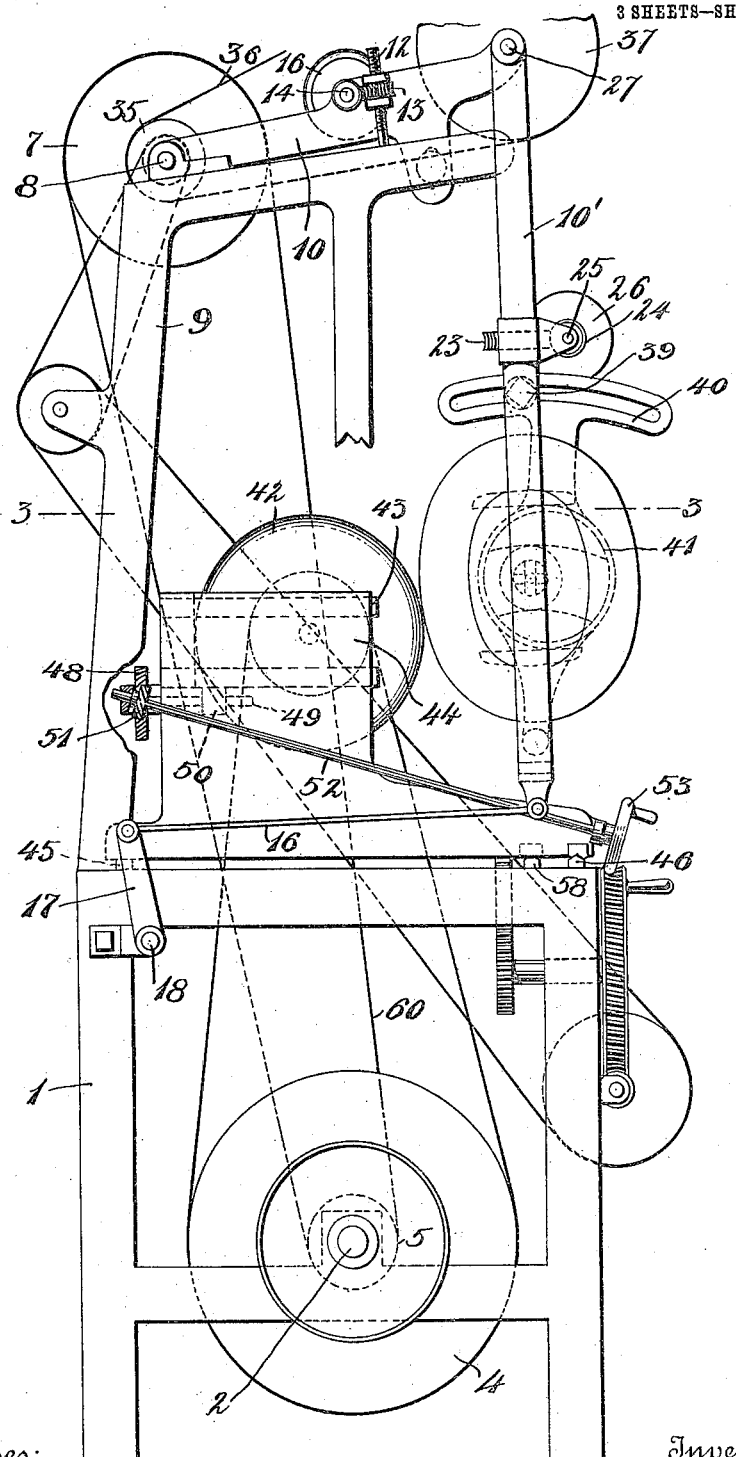
Figure 2:
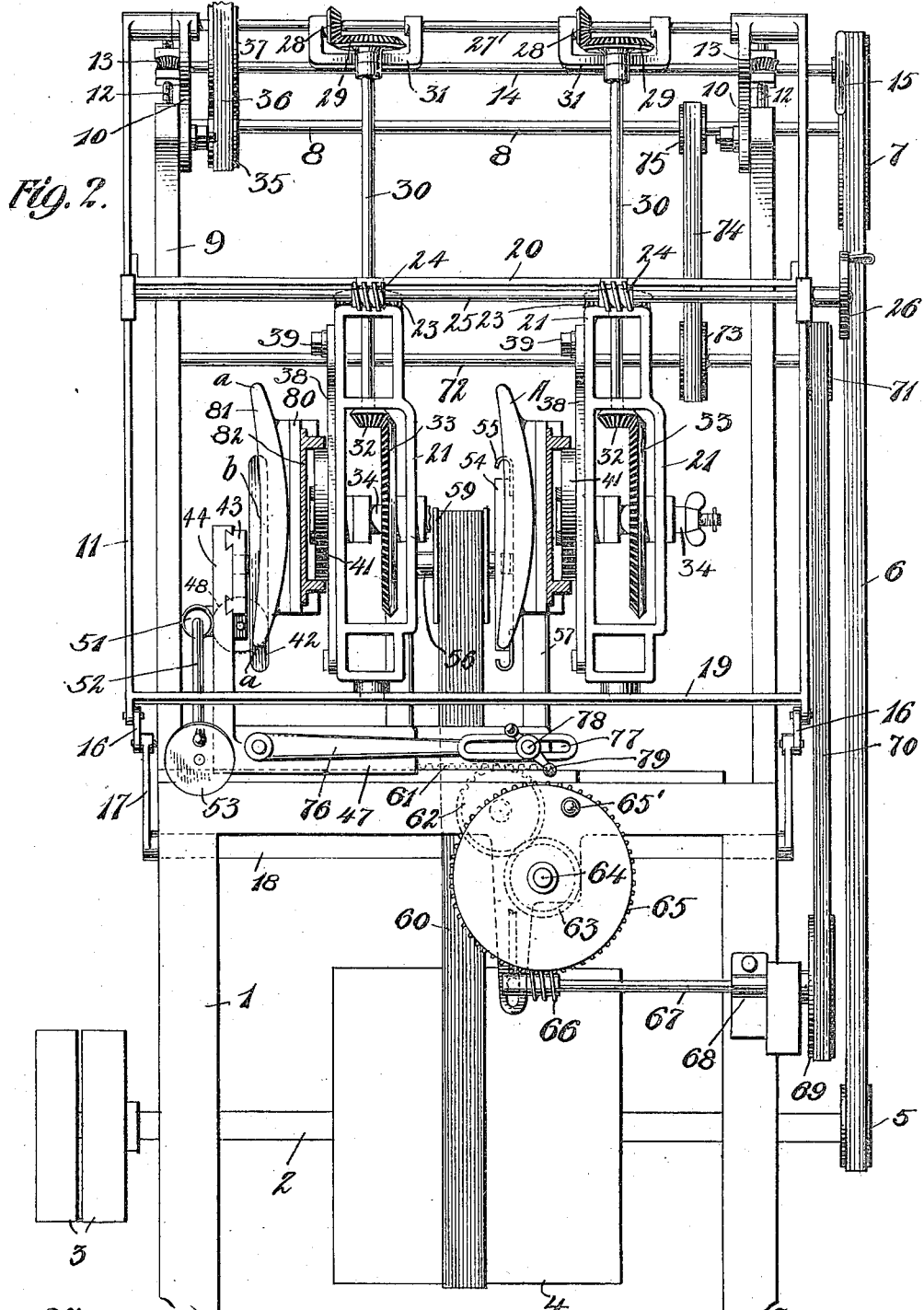

With these and other objects in view, the invention consists in the construction and arrangement of parts a preferred embodiment of which is illustrated in the accompanying drawings, in which, Figure 1 is a side elevation of a machine embodying my invention. Fig. 2 is a front elevation thereof. Fig. 3 is a plan view in horizontal section on line 3—3 Fig. 1, parts being removed for clear illustration and showing the cutter in section. Fig. 4 is a detail sectional view of a pattern or form support and the actuating parts connected therewith. Fig. 5 is a detail view of the operative connecting means between the form or pattern and the rotating means therefor. Fig. 6 is a sectional view upon the line 6—6 Fig. 5. Fig. 7 is a detail of parts shown in Fig. 4.

The embodiment of my invention herein selected for illustration comprises the base frame 1, upon which is journaled a power shaft 2 having loose and fast pulleys 3 thereon, said shaft also carrying a broad belt pulley 4 for the actuation of parts hereinafter described. A pulley 5 on the power shaft 2 is connected by a belt 6 to a second pulley 7 on a main drive-shaft 8, suitably journaled in the upper portion of a superstructure 9 of the machine frame. Upon adjusting arms 10 pivoted concentrically with the drive shaft 8 is hung a swinging frame 11, which carries the supports and actuating mechanism for the pattern and work, respectively. Said frame 11 may be adjusted vertically through the screws 12, which contact with the upper portion of the main frame 9, worm gears 13 and worm shaft 14, the latter being provided with hand wheel 15 for manual adjustment. By this adjustment it is possible to so relatively position the pattern relatively to the tracer when the latter is working upon the face of the pattern as to more readily reach deep depressions in the face of said pattern. For example, in working upon forms for ladies' hats, which in most cases are irregular and present deep depressions in one side or the other, the pattern must be so adjusted that it will permit the tracer to reach to the bottom of said depression. To this end, said pattern may be so adjusted as to position its center above or below the center of the tracer so that either the upper or lower edge of the tracer may so engage the walls of such deep depressions in the pattern as to enable it to reach to the bottom of said depressions.

To steady the lower end of the frame and to cause the same to swing true with respect to the tracer and cutter, the same is connected by means of links 16 with arms 17 secured to a rock shaft 18 suitably mounted at the rear of the base frame 1 of the machine. The swinging frame 11 is provided with cross bars 19 and 20, between which are pivoted the pattern and work supports 21—21. The upper ends of said supports are provided with heads 22, Fig. 4, to which are splined worm gears 23 arranged for actuation by the worms 24 upon a shaft 25, said shaft being provided with a hand wheel 26 for manual operation and rotation of said frames. Journaled at the upper end of the swinging frame 11 is a shaft 27, to which are fixed the bevel gears 28 which mesh with corresponding gears 29 on the upper end of the vertical shafts 30, which are journaled in yokes 31 hung from said shaft 27 and having bearings within the supports 21. The lower ends of said shafts 30 are provided with bevel gears 32, meshed with gears 33 splined upon hollow shafts 34 also journaled in said supports 21. The shaft 27 may be suitably driven from the main driving shaft 8 by the pulley and belt connections 35, 36, and 37. By reason of the relative arrangement and gearing of the shafts 27 and 30, it will be evident that said shafts 30 may be driven from the gears 28 in all positions of adjustment of the swinging frame 11. The pattern and work supports 21 have pivoted at their lower ends respectively the eccentric carriers 38, which may be adjusted with respect to said supports through the screw and slot connections 39—40, Fig. 1, at the upper ends of said carriers. Each of said carriers is provided with a circular flange or ring 41, which, when the carriers 38 are adjusted in alinement with the supporting frames 21, are concentric with the shafts 34 carrying the actuating gears 33, in which position the contours and size of the work produced will correspond in outline to those of the pattern, as hereinafter described.

Before proceeding with a detailed description of the means and manner of attaching the patterns and work to their respective supports, the construction and arrangement of the tracer and cutter will be described. The former is of usual construction and consists of a disk 42 having a rounded edge to properly engage the pattern in the usual manner, said tracer being rotatable upon a sliding support 43 adjustable upon the tracer carriage 44, which carriage is supported upon rails 45 and 46 at the rear and front of the base frame 1 respectively, the front rail 46 being of the knife edge type to engage a corresponding groove in the base of the tracer carriage 44. Said carriage, furthermore, is provided with a lateral extension 47, which serves to steady the carriage on the rail 46.

Adjustment of the tracer toward the front and rear of the machine respectively, is effected through a worm gear 48, Fig. 1, secured to a screw 49, which is threaded in a lug 50 attached to the adjustable tracer support 43. Said gear 48 meshes with a corresponding gear 51 on an adjusting shaft 52, suitably journaled upon the tracer carriage, which shaft is provided at its forward end with a hand wheel 53 for manual operation.

The cutter 54 is provided with a plurality of blades 55 and is mounted upon a shaft 56 journaled in suitable bearings on the cutter carriage 57, which carriage is supported upon the guiding rails 45 and 58, whereby the same may be adjusted transversely of the machine. To actuate the cutter, the shaft thereof is connected by means of a belt pulley 59 and belt 60 with the wide belt pulley 4 upon the main power shaft 2. The width of the pulley 4 serves to maintain the belt thereon in all positions of feed and adjustment of the cutter carriage. To provide for such feed and adjustment, the cutter carriage carries a rack 61, which meshes with a suitable pinion 62, which in turn is in mesh with a gear 63 on a shaft 64, which shaft also carries a worm gear 65. In normal operation of the machine said worm gear 65 is in mesh with a worm 66 on the shaft 67, journaled in a pivoted bearing 68 on the base frame 1. Said shaft 67 carries a belt pulley 69, which, by belt connection 70 with a pulley 71 on a shaft 72 may be actuated through pulley 73 on said shaft 72, belt 74, and pulley 75 from the main drive shaft 8. By this construction, the cutter carriage and cutter will be slowly fed to the right transversely of the machine, as viewed in Fig. 2, during the cutting operation.

In order to cause the tracer and its carriage to follow this transverse feed of the cutter, said tracer carriage has mounted thereon a connecting link 76 having a slotted end 77 engaging a screw 78 secured to the cutter carriage 57. This slotted link connection permits adjustment of the distance between the tracer 42 and the cutter 54 to vary the character of the work cut out, and said parts are held in adjusted position by the hand nut 79.

Referring now to the manner of and means for mounting the pattern and work on their respective supports 21. Inasmuch as said means are exact duplicates, a description of one will suffice for both. The pattern support consists of a block 80, to which the pattern 81 may be secured in any desired and usual manner. Upon the back of the block 80 is mounted a transverse plate 82 having dove-tailed edges 83, Fig. 6, arranged to engage a dove-tailed slot 84 in an actuating slide head 85. Said transverse plate 82 has secured thereto, or formed integral therewith, the transverse guides 86, which, when the pattern support is connected with its actuating mechanism, contact at diametrically opposite points of the eccentric ring 41 on the eccentric support 38.

In order to connect the pattern support with its actuating mechanism, the slide head 85 is provided with a hub 87, which is located over the plate 82 on the pattern support or block 80 and is provided with sockets 88 arranged to engage over pins 89 secured to a disk 90 on the forward end of the hollow shaft 34, said shaft having also a projection 91 adapted to engage a corresponding socket 92 in the hub 87. In order to secure the slide head 85 firmly to the actuating shaft 34, the latter has threaded therein a screw 93, provided at its inner end with a cross head 94 adapted to be inserted through a suitable slot 95 into a socket 96 in the inner end of the hub 87. When said cross head is turned at an angle to its position of insertion and over the ledges 96', it may be locked in position and the work support secured firmly to the shaft 34 by means of a thumb nut 97 at the outer end of said screw 93, Fig. 4. With the pattern thus secured in position and connected with its actuating mechanism, and with the work correspondingly secured and connected upon its support, the pattern and work are caused to rotate in unison through the shafts 30 and gears 32—33.

In the operation of the machine, the tracer 42 is so adjusted upon the machine frame as to properly engage the pattern 81 and the cutter 54 is properly adjusted with respect to the tracer to correspondingly operate upon the work designated as A, consisting of a block of suitable material, out of which the desired form may be cut or turned. In the operation of the machine, and with the tracer and cutter relatively centered, and with the eccentric ring 41 centered with respect to the actuating shaft 34, the work produced will be an exact counterpart, in shape and dimensions, of the pattern. If, however, it is desired to produce a form of greater area than the pattern, the same may be effected by adjusting the tracer 42 to the proper distance to the front, and, conversely, to produce a form of less area than the pattern, the tracer may be adjusted toward the rear.

In the respective positions of the tracer and cutter illustrated in Figs. 1 and 2, the cutting operation will be performed upon the perimeter of the form, and inasmuch as the swinging frame 11 may swing freely, it is obvious that the line of cut will follow accurately the outline of the perimeter of the pattern as the same rotates in contact with the perimeter of the tracer 42. The curve of the cutting blade corresponds exactly to that of the edge of the tracer, whereby that portion of the cutting edge will operate which corresponds to the same point or portion of the curved edge of the tracer which is in contact with the pattern. It is to be noted that at the beginning of operation the perimeter of the tracer is in contact with the left-hand side of the perimeter of the pattern, as viewed from the front, and the cutter operates upon the corresponding part of the work. During the cutting operation the cutter and tracer are fed slowly to the right by the mechanism above described, whereby the curve of the perimeter of the tracer feeds over the edge of the pattern, and through the swinging movement of the swinging frame 11, caused by the contact of the tracer and pattern, the cutting knife follows a corresponding spiral path on the perimeter of the work.

In cutting the perimeter of a dished form, such as that shown at A in Figs. 1, 2 and 4, which is a pattern for a hat brim, and in order to prevent the tracer from slipping past the pattern when operating in contact with the dished portion $b$ at the side of the pattern, and the portions $a$ at the top and bottom of the pattern, as here shown, it is necessary that the pattern and work be so positioned with relation to the tracer and cutter respectively as to bring the points $a$ and $b$ of the pattern in line with the tracer as the pattern and work revolve, for otherwise by reason of the dished form of the face of the pattern, the latter if presented directly edge on to the tracer would swing inwardly free and alongside of the tracer when the dished part of the pattern 81 is opposite thereto. In operation, therefore, the pattern and work supports are adjusted at such an angle with respect to the tracer and cutter, respectively, as to accomplish this result. The pattern will thereupon automatically control the movement of the swinging frame and consequently the line of cut on the work.

When it is desired to turn out work of less area than the pattern, the tracer is adjusted to the rear on its supporting block 43 to the desired extent determined by convenient scales on the block 43 and the carriage 44 of said tracer, and, conversely, when it is desired to turn out work of greater area than the pattern, the tracer is correspondingly adjusted to the front.

To properly position the pattern and work to operate upon the face of the latter, the supporting frames 21—21 are rotated through the worms and gears 23—24 on the shaft 25 by hand wheel 26 on the end of said shaft, until the pattern and work present their flat faces to the tracer and cutter respectively. When it is desired to reproduce both the shape and the size of the face of the pattern, the tracer and cutter carriages are so relatively adjusted as to make initial contact with the center of the pattern and the work respectively. The subsequent feed of the tracer and cutter to the right serves to reproduce precisely the contours and proportions of the pattern upon the face of the work.

In working upon the faces of elliptical forms, such as here shown, it is necessary that the pattern and work be so moved transversely of the tracer and cutter respectively that the pattern will be at all times maintained in contact with the tracer and the cutter follow a corresponding line upon the work, notwithstanding the difference in the lengths of the longitudinal and transverse axes of the pattern and work respectively. To this end the arms 38 carrying the cam rings 41 upon the supporting frames 21 of the pattern and work respectively, are adjusted upon said frames 21 to position said cam rings 41 eccentrically with respect to the shafts 34, whereupon as the cam tracks 86 of the slide plates 82 upon the pattern and work supports, respectively, traverse said cam ring 41, the pattern and work will be shifted to the right during rotation, as the points of the pattern are reached by the tracer, to cause the tracer and cutter, respectively, to traverse elliptical paths upon the pattern and work respectively, corresponding to the elliptical shape of the pattern. By this means the tracer will be maintained constantly in contact with the pattern notwithstanding the difference in the length of the major and minor axes thereof. This adjustment of the cam ring 41 may be effected before the pattern and work are placed in position in the machine and maintained, also during the operation upon the perimeter of the pattern and work respectively, for it is obvious that notwithstanding this eccentric position of the perimeter of the pattern and work, the exact outline of the pattern will be reproduced in the work by reason of the travel of the pattern in contact with the tracer and the swinging movement of the supporting frame 11. This eccentric adjusting means may also be utilized to produce variations from the pattern in the work. For example, by adjusting the eccentric ring upon the work support farther off the center and away from the cutter than the pattern eccentric a longer oval will be produced in the work and vice versa by adjusting the work eccentric off the center and toward the cutter, a lesser oval than the pattern will be produced.

When it is desired to reproduce a form upon the face of the work of less area than the pattern, the tracer is so adjusted with respect to the cutter as to make initial contact at a point upon the pattern face removed from the center of the latter, while the cutter is at the same time initially positioned to operate upon the center of the block from which the form is to be produced. It will be evident from this arrangement that the tracer during its feed will reach the perimeter of the face of the pattern after traversing a path equal to the difference between the distance of the center of the pattern to its perimeter and the distance between the pattern center to the point of initial contact of the governor with the face thereof.

In order to permit of free lateral adjustment of the cutter carriage to position the same properly with respect to the work, independently of the work, the worm 66 on the shaft 67 may be disengaged from the worm gear 65 of the feed mechanism for the cutter carriage, whereupon the said gear 65 may be turned freely, as by means of the handle 65′. The tracer carriage 44 also may be freely adjusted by loosening the thumb nut 79, which engages the connecting arm 76.

While I have herein described a particular form of my invention, the same may be altered in details as well as arrangement of parts without departing from the spirit and scope thereof.

What I claim is:

1. In a machine for turning irregular forms, a tracer, a cutter, a single movable pattern and work supporting frame, means to rotate the pattern and work respectively in unison on said frame, and means to turn the pattern and work bodily at different angles with respect to the tracer and cutter respectively.

2. In a machine for turning irregular forms, a tracer, a cutter, a movable pattern and work supporting frame, means to rotate the pattern and work in unison on said frame, and means to present the perimeters or the faces of the pattern and work respectively, at different angles to said tracer and cutter respectively.

3. In a machine for turning irregular forms, a tracer, a cutter, a swinging pattern and work supporting frame, means on said frame for rotating said pattern and work respectively, means for adjusting said pattern and work respectively angularly on said frame to present their perimeters or faces to said tracer, and cutter respectively, and means for adjusting the center of rotation of said pattern to maintain the tracer in contact with the pattern irrespective of irregularities in the outline of the latter.

4. In a machine for turning irregular forms, a rotary tracer, a rotary cutter, a swinging frame and pattern support and a work support mounted in said frame adjacent said tracer and cutter respectively, means for rotating said pattern and work in said frame, and means for shifting the axes of rotation of said pattern and work supports respectively in said frame to maintain the pattern and work in contact with the tracer and cutter respectively, irrespective of irregularities in the outline of the pattern.

5. In a machine for turning irregular forms, a tracer, a cutter, a pattern support and a work support, means for rotating the pattern and work respectively in their supports, and means to shift the center of rotation of the pattern to maintain the face of the pattern in contact with the tracer, irrespective of irregularities of the perimiter of said pattern.

6. In a machine for turning irregular forms, a tracer, a cutter, a pattern support and a work support, means for rotating said pattern and work respectively in said supports and means for varying the relative positions of the axes of rotation of the pattern and work respectively with respect to the axes of rotation of their actuating mechanisms.

7. In a machine for turning irregular forms, a tracer, a cutter, a pattern support and a work support, means for rotating the pattern and work respectively in said supports and independent means for causing the pattern and work respectively to rotate eccentrically with respect to the axes of rotation of their actuating mechanism.

8. In a machine for turning irregular forms, a rotary tracer, a rotary cutter, a pattern support and a work support, means for rotating the pattern and work on said supports respectively means for varying the positions of the axes of rotation of the pattern and work respectively with respect to their supports and means for adjusting said supports angularly with respect to said tracer and cutter respectively.

9. In a machine for turning irregular forms, a tracer, a cutter, a swinging pattern and work supporting frame, an adjustable pattern support and an adjustable work support on said frame, means for adjusting the pattern and work angularly with respect to the tracer and cutter respectively to present their perimeters or faces to the governor and cutter respectively, actuating means to rotate said pattern and work and means on said frame to vary the relative positions of the axes of rotation of the pattern and work respectively with respect to their actuating mechanisms when the faces of said pattern and work are presented to the governor and cutter respectively.

10. In a machine for turning irregular forms, a tracer, a cutter, a swinging pattern and work supporting frame, a pattern support and a work support mounted on said frame and angularly adjustable therein whereby the pattern and work respectively may be presented at any desired angle to said tracer and cutter respectively and means to rotate said pattern and work synchronously in either position of adjustment.

11. In a machine for turning irregular forms, a tracer and a cutter, a pattern support and a work support, actuated means for rotating said pattern and work respectively on said supports and adjustable means on said supports to shift the positions of the axes of rotation of the pattern and work respectively with respect to their respective actuating mechanisms.

12. In a machine for turning irregular forms, a tracer, a cutter, a pattern support and a work support, means for rotating said pattern and work respectively on said supports, adjustable cam rings on said supports respectively and means secured to said pattern and work respectively adapted to engage said rings whereby the positions of the axes of rotation of said pattern and work respectively may be varied with respect to their actuating mechanism.

13. In a machine for turning irregular forms, a tracer, a cutter, a pattern support and a work support, means to rotate said pattern and work respectively on said support, cam rings on said supports adjustable with respect to the axes of rotation of said actuating means and means secured to said pattern and work respectively to engage said rings whereby said pattern and work may be caused to rotate eccentrically with respect to their actuating mechanisms.

14. In a machine for turning irregular forms, a governor, a cutter, a swinging pattern and work supporting frame, a pattern support and a work support adjustably mounted on said frame whereby the perimeters or faces of the pattern and work respectively may be presented to the governor and cutter respectively at any desired angle and means for feeding the governor and cutter transversely of the pattern and work during the turning operation.

15. In a machine for turning irregular forms, a governor, a cutter, a swinging pattern and work supporting frame, a pattern support and a work support on said frame, pattern and work rotating means on said supports respectively and adjustable means for causing said pattern and work to rotate eccentrically with respect to the governor and cutter respectively.

16. In a machine for turning irregular forms, a pattern support and a work support, means for rotating said pattern and work on their supports respectively, adjustable means on said supports to cause said pattern and work to rotate concentrically with their rotating mechanism and to rotate eccentrically therewith.

17. In a machine for turning irregular forms, a tracer, a cutter, a pattern support, a work support, means for rotating the pattern and work respectively on their supports and means for adjusting the axis of rotation of the work on its support with respect to the pattern to vary the proportions and outline of the work from that of the pattern.

18. In a machine for turning irregular forms, a pattern support, a work support, means for rotating said pattern and said work respectively on said supports, adjusting means on said work support to cause the work to rotate eccentrically with respect to its rotating means and means to adjust said supports angularly to produce variations from the pattern in the work.

CHARLES W. STEVENS.

Witnesses:
 RALPH C. POWELL,
 M. E. GARRETT.